Aug. 15, 1933.   R. S. BASSETT   1,922,071
LIQUID METER
Filed May 2, 1930   2 Sheets-Sheet 1

INVENTOR
Robt. S. Bassett

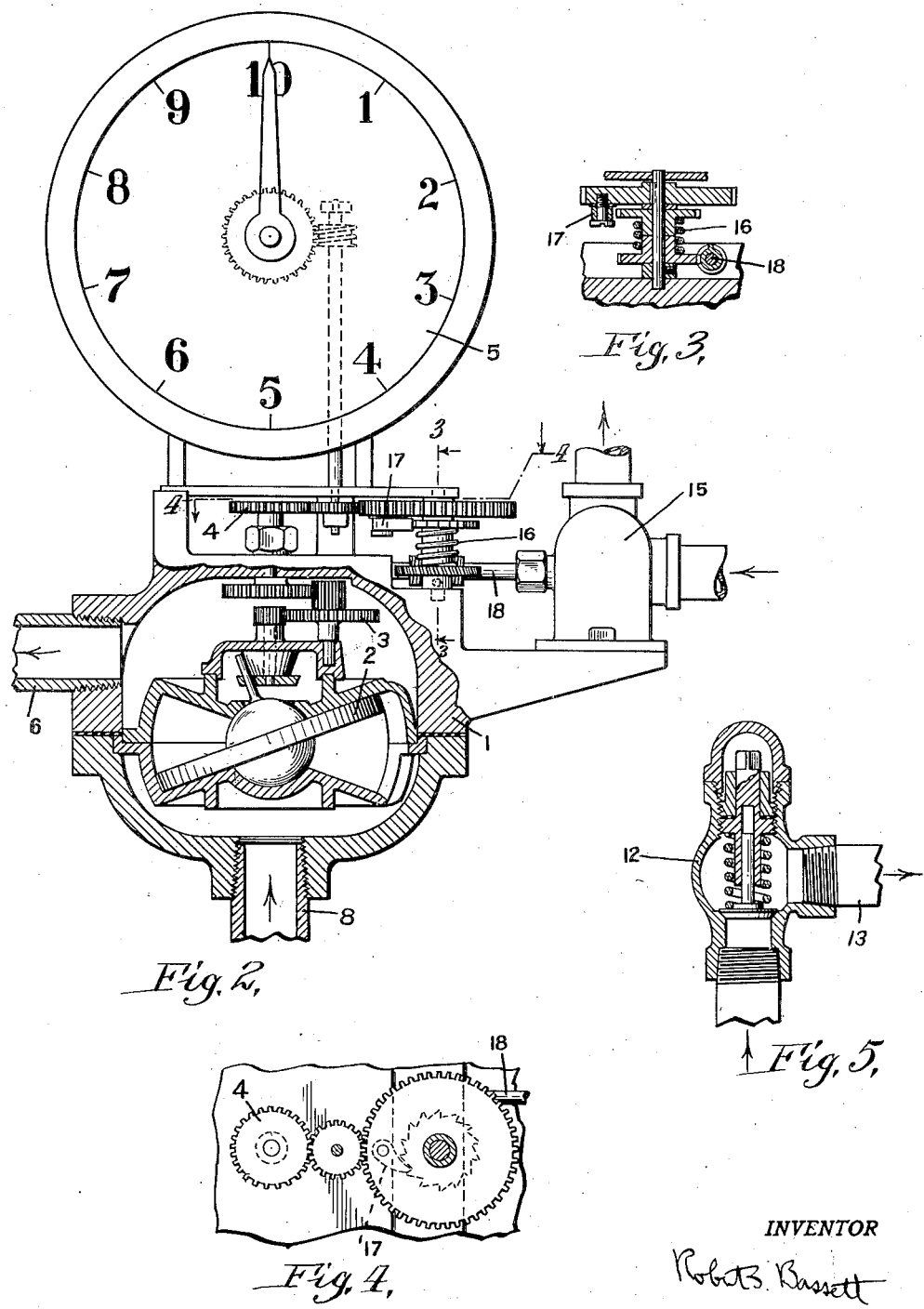

Patented Aug. 15, 1933

1,922,071

UNITED STATES PATENT OFFICE 1,922,071

LIQUID METER

Robert S. Bassett, Buffalo, N. Y.

Application May 2, 1930. Serial No. 449,234

3 Claims. (Cl. 73—167)

My invention relates to improvements in liquid meters in which a register is driven by a liquid operated mechanism to measure flows at rates varying from high and medium rates of flow, at which a semi-positive or positive displacement meter will operate at a high degree of accuracy, to the flows at a lower rate at which the friction of the moving parts including the register is slightly too great for satisfactory operation by the power of the liquid operated mechanism alone.

The objects of my invention are principally to provide an auxiliary source of power to assist the liquid operated mechanism in driving the meter register when the flow through the liquid operated mechanism is at such a low rate that it does not provide sufficient power itself, and to provide energy for the auxiliary source of power in approximate proportion to the requirements for the auxiliary power.

Figure 1:
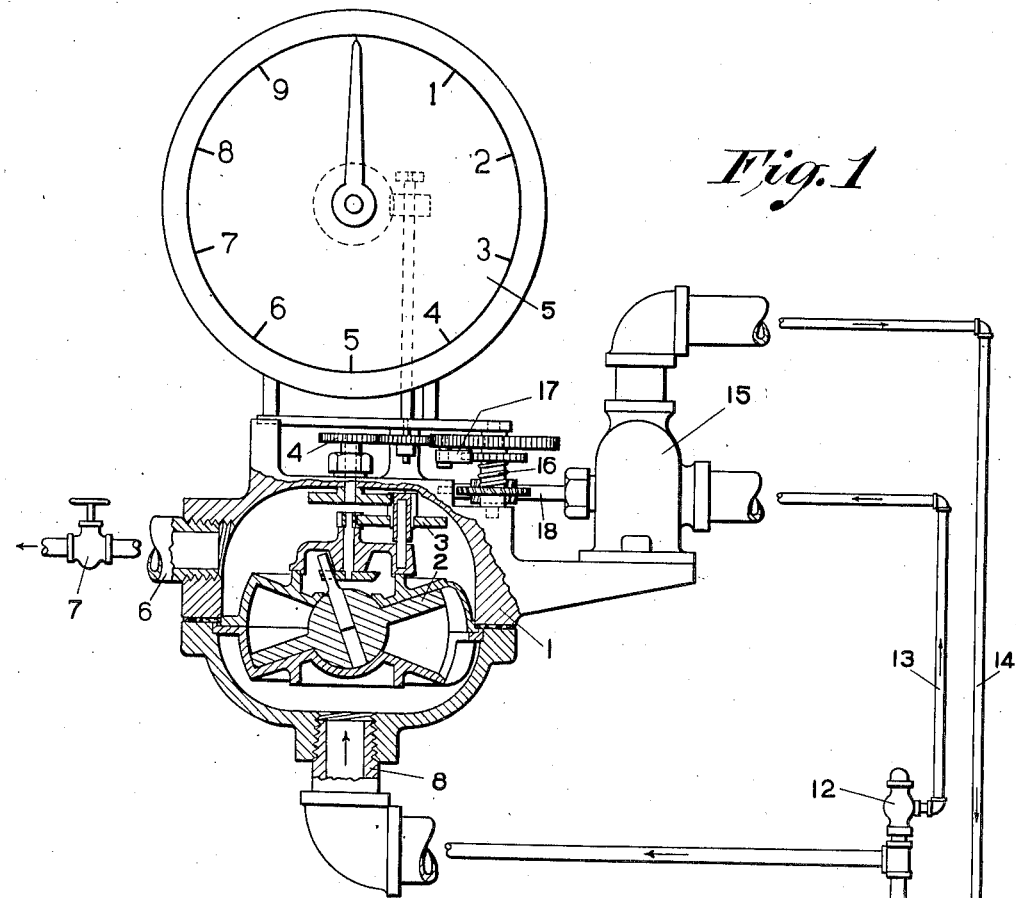
Figure 6:
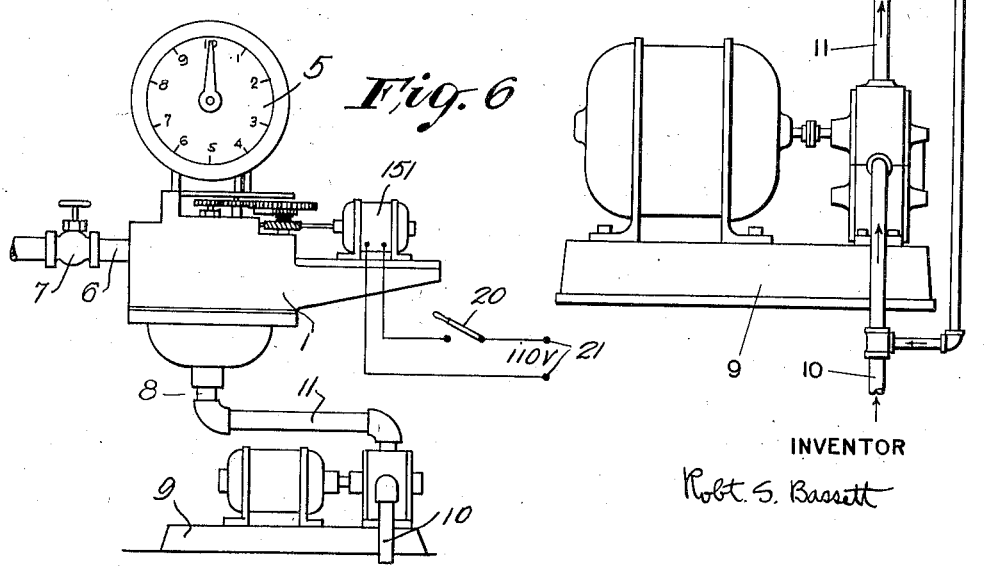

I will now proceed to describe the manner in which I have carried out my invention and then claim what I believe to be novel. It is realized that the present invention may be embodied in constructions other than those specifically disclosed herewith and, therefore, this disclosure is to be understood as illustrative and not in a limiting sense. In the accompanying figures: Fig. 1 is an elevational view of the liquid meter coupled up to a typical pump and motor and with the casing surrounding the measuring mechanism and the measuring mechanism itself shown in cross-section. Fig. 2 is a similar but enlarged view of the same. Fig. 3 is an enlarged, fragmentary, vertical section of the same taken on line 3—3, Fig. 2. Fig. 4 is an enlarged fragmentary, vertical section of said meter taken on line 4—4, Fig. 2. Fig. 5 is a considerably enlarged, vertical section through the liquid pressure relief valve. Fig. 6 is a modified form of the invention showing an electrically operated auxiliary source of power. Element 151 is an electric motor which is not limited in any way except that as shown in the drawing it exerts a rotary torque. Element 21 is the source of an electric power which is indicated as being at the customary voltage of 110 volts. Element 20 is a switch of customary type for connecting and disconnecting source of power 21 to electric motor 151.

Outer casing (1) encloses measuring mechanism (2) which is shown as of the nutating disc type but not limited to this exact construction. (3) is a submerged train of gears and (4) is an external train of gears operatively connecting measuring mechanism (2) to register (5) which shows the amount of liquid that has passed through the measuring mechanism in the customary manner. (6) is the outlet flow passage from the meter on which is control valve (7) for starting and stopping the flow through the meter. (8) is the inlet flow passage carrying the liquid to be measured up to measuring mechanism (2).

The piping system (lower right hand corner of drawing) leading to the measuring mechanism is shown on a reduced scale. (9) is a suitable pump mechanism drawing liquid from supply pipe (10) and forcing the liquid out under pressure through pump discharge pipe (11). (12) is a pressure control or unloading, pressure relief valve allowing passage of liquid through it into pipe 13 when the liquid passed by pump mechanism (9) is greater in quantity than can be forced through measuring mechanism (2) and control valve (7) by reason of the pressure in the pump discharge pipe (11).

As pump mechanism (9) usually has a flow capacity considerably in excess of the flow desired at control valve (7), there is at almost all times a re-circulation of the liquid through pressure relief valve (12) and return line (13) and (14) back to the supply pipe (10). The flow through the return line (13) and (14) is larger when the flow through measuring mechanism (2) is low, than it is when the flow through measuring mechanism (2) is near its maximum. This is because the discharge of pump mechanism (9) does not vary greatly with minor fluctuations of opposing pressure head, so that the total of the flows through measuring mechanism (2) and return line (13) and (14) is approximately a constant.

When the flow through measuring mechanism (2) is at a low rate at which the friction of the moving parts, including register (5), is slightly too great for satisfactory operation by the power of liquid operated measuring mechanism (2) alone, the flow through return line (13) and (14) is near a maximum and there is power available because of this flow, to aid in overcoming the friction of the moving parts including register (5).

Auxiliary motor (15) is operatively connected to register (5) through a friction drive clutch (16), and a ratchet drive (17) which will allow the operation of the external train of gears (4) by the measuring mechanism (2) when the auxiliary motor (15) is not operating and when its drive shaft (18) is stationary.

Ratchet drive (17) will, on the other hand, allow the operation of the external train of gears (4) at a rate higher than that at which they would be driven through ratchet drive (17). The exact construction of ratchet drive (17) is not limited to the form shown as the drive may be obtained in a number of ways, as it acts similar to the coasting mechanism of a coaster brake on a bicycle which allows the bicycle to coast freely with the pedals stationary or moving at such a slow rate that they do not drive the bicycle. Friction drive (16) is to allow the operation of auxiliary motor (15) when the external train of gears (4) are stationary. The friction drive (16) is so constructed that the power transmitted from auxiliary motor (15) is not sufficient to move measuring mechanism (2) unless there is a flow of liquid passing through it to be measured.

The auxiliary source of motive power is not limited to the exact form shown but could have other sources of energy such as electricity as indicated in Fig. 6. In Fig. 1 I have indicated a conventional liquid driven turbine type motor though because of the friction drive transmitting the power of said auxiliary motor it could be a positive type liquid driven motor, though the most satisfactory operation would probably be from a turbine type motor.

It will be now apparent that I have shown an arrangement whereby the auxiliary power (15) driving the registering mechanism (5) is available to the greatest extent when it is most needed, which is at points of extremely low rates of flow through said measuring mechanism, at which rates of flow the measuring developed by the power mechanism (2) is hardly more than sufficient to operate its submerged train of gears and not sufficient to drive the external moving parts without excessive slippage of the liquid through the working joints of the measuring mechanism per unit volume of liquid delivered through the valve (7).

Having described my invention what I claim is:

1. In a liquid meter, a liquid operated measuring mechanism, a registering mechanism, connecting means positively connecting said registering mechanism to said liquid operated measuring mechanism and preventing operation of said registering mechanism independent of the operation of said liquid operated measuring mechanism, a friction drive clutch, an overrunning clutch, and an auxiliary motor operatively connected through said friction drive clutch to said registering mechanism and adapted to exert increased torque for actuating said registering mechanism when the speed of said registering mechanism falls below a certain predetermined point, substantially as and for the purpose described.

2. In a liquid meter, a liquid operated measuring mechanism, a registering mechanism, connecting means positively connecting said registering mechanism to said liquid operated measuring mechanism and preventing operation of said registering mechanism independent of the operation of said liquid operated measuring mechanism, a friction drive clutch, an overrunning clutch, and a liquid operated auxiliary motor operatively connected through said friction drive clutch to said registering mechanism and adapted to exert increased torque for actuating said registering mechanism when the speed of said registering mechanism falls below a certain predetermined point, substantially as and for the purpose described.

3. In a liquid meter, a liquid operated measuring mechanism, a registering mechanism, connecting means positively connecting said registering mechanism to said liquid operated measuring mechanism and preventing operation of said registering mechanism independent of the operation of said liquid operated measuring mechanism, a friction drive clutch, an overrunning clutch, a liquid operated auxiliary motor operatively connected through said friction drive clutch to said registering mechanism and adapted to exert increased torque for actuating said registering mechanism when the speed of said registering mechanism falls below a certain predetermined point, a liquid pumping mechanism discharging liquid directly into both said liquid operated measuring mechanism and said motor, and means for returning the discharge from said motor to said pumping mechanism, substantially as and for the purpose described.

ROBERT S. BASSETT.